United States Patent [19]

Yokote et al.

[11] E Patent Number: Re. 33,020

[45] Reissued Date of Patent: Aug. 15, 1989

[54] AUTOMATIC SEAT BELT DRIVING DEVICE

[75] Inventors: Yoshihiro Yokote, Yokohama; Kazuo Yamamoto, Sagamihara, both of Japan

[73] Assignee: NSK-Warner K.K., Japan

[21] Appl. No.: 138,536

[22] Filed: Dec. 24, 1987

Related U.S. Patent Documents

Reissue of:

[64] Patent No.: 4,564,218
Issued: Jan. 14, 1986
Appl. No.: 601,003
Filed: Apr. 16, 1984

[30] Foreign Application Priority Data

Apr. 28, 1983 [JP] Japan ..... 58-63168
Apr. 28, 1983 [JP] Japan ..... 58-63169

[51] Int. Cl.[4] ..... B60R 21/10
[52] U.S. Cl. ..... 280/804; 242/77.1; 242/86.5 R
[58] Field of Search ..... 280/801, 802, 804; 242/68.5, 77.1, 86.5; 74/501 R, 506

[56] References Cited

U.S. PATENT DOCUMENTS

| | | | |
|---|---|---|---|
| 2,990,128 | 6/1961 | Hansen et al. | 242/77.1 |
| 3,900,078 | 8/1975 | Otani | 280/804 |
| 4,205,806 | 6/1980 | Fujimura | 242/77.1 |
| 4,410,202 | 10/1983 | Takada | 280/804 |
| 4,615,234 | 10/1986 | Chevance et al. | 74/501 R |

FOREIGN PATENT DOCUMENTS

| | | | |
|---|---|---|---|
| 2156926 | 5/1973 | Fed. Rep. of Germany | 280/804 |
| 8022013 | 4/1982 | France . | |
| 8108874 | 11/1982 | France . | |

*Primary Examiner*—Kenneth R. Rice
*Attorney, Agent, or Firm*—Skjerven, Morrill, MacPherson, Franklin & Friel

[57] ABSTRACT

In a driving device for moving an automatic seat belt between a seat occupant restraining position and a seat occupant liberating position, a rotatable member to which one end of an elongate drive member is attached and by which the drive member is taken up or pushed out is formed with a portion for containing the drive member therein, and the drive member is guided from the portion to an exit lying at a position deviated in the direction of the rotational axis of the rotatable member and is pushed out from the exit.

28 Claims, 11 Drawing Sheets

AUTOMATIC SEAT BELT DRIVING DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a driving device used in an automatic seat belt system to move the seat belt between a seat occupant restraining position and a seat occupant liberating position.

2. Description of the Prior Art

A driving device is generally known in which a flexible drive member having one end attached to a rotatable member and the other end attached to a seat belt or a movable anchor or the like to which the seat belt is attached is taken up onto the rotatable member or pushed out therefrom to thereby move the seat belt in the automatic seat belt system between a seat occupant restraining position and a seat occupant liberating position. However, in the driving device according to the prior art, the entrance and exit for the drive member formed in a frame member provided in a stationary state relative to the rotatable member lies in the same plane as the drive member taking-up space portion of the rotatable member with respect to the direction of the rotational axis of the rotatable member. Accordingly, the drive member which tends to be inflated radially outwardly when pushed out from the rotatable member is strongly urged against the wall surface of the frame member which lies in the same plane over a considerable range to the exit and even if the rotatable member rotates to try to push out the drive member, a situation in which the drive member is not smoothly pushed out from the exit due to the frictional action with said wall surface is liable to occur. Also, a situation in which a frictional action interacts between a plurality of turns of the drive member, whereby the drive member fails to be smoothly pushed out from the exit is liable to occur.

SUMMARY OF THE INVENTION

It is therefore an object of the present invention to provide an automatic seat belt driving device in which an exit formed in a frame member provided on a fixed side is deviated from a drive member taking-up space portion with respect to the direction of the rotational axis of a rotatable member to minimize the area over which the drive member when pushed out contacts the stationary wall surface of the frame member and reduce the frictional action or the like which hinders smooth push-out of the drive member.

It is another object of the present invention to provide an automatic seat belt driving device in which a spiral groove for containing the drive member therein is formed in the rotatable member to eliminate the possibility of portions of the drive member imparting a frictional action to each other and the drive member when pushed out from the rotatable member is prevented from being inflated radially outwardly to thereby minimize the frictional action with the stationary wall surface and enable the drive member to be smooothly pushed out from the exit of the drive member deviated in the direction of the rotational axis of the rotatable member.

The invention will become fully apparent from the following detailed description thereof taken in conjunction with the accompanying drawings.

DESCRIPTION OF THE PREFERRED EMBODIMENT

Some embodiments of the present invention will hereinafter be described by reference to the drawings.

Figure 1:
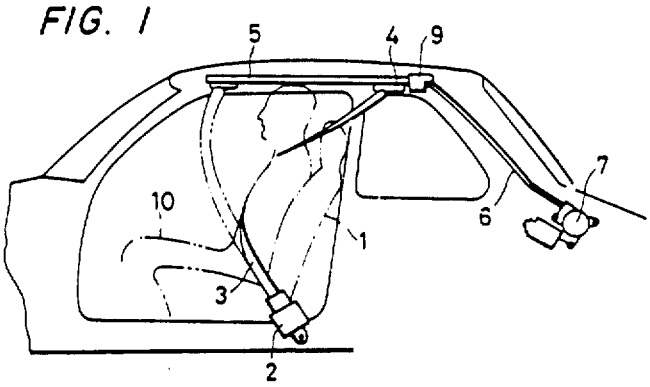
FIG. 1 schematically shows the entirety of an example of the automatic seat belt device.

FIG. 1 schematically shows the entirety of an automatic seat belt device in which an embodiment of the driving device according to the present invention is provided. A retractor 2 is attached to the inner side of a seat 1 and a belt 3 extends out from the retractor to a movable anchor 4. The movable anchor 4 is movable back and forth along a guide member 5 attached to the roof side on the outer side of the seat 1. The anchor 4 may be moved by a belt-like elastic flexible drive member 8 (see FIG. 2 and so on) extending in a tube 6 and taken up by a take-up deivce 7 and pushed out therefrom. When the drive member 8 is taken up by the take-up device 7 and the movable anchor 4 is moved rearwardly and assumes a position in which it is latched by a latch portion 9, the belt 3 restrains the seat occupant 10 as indicated by solid lines. When the drive member 8 is pushed out from the take-up device 7 and the movable anchor 4 is moved forwardly, the belt 3 liberates the seat occupant 10 as indicated by dots-and-dash lines and permits the seat occupant to get on and off the seat 1.

Figure 2:
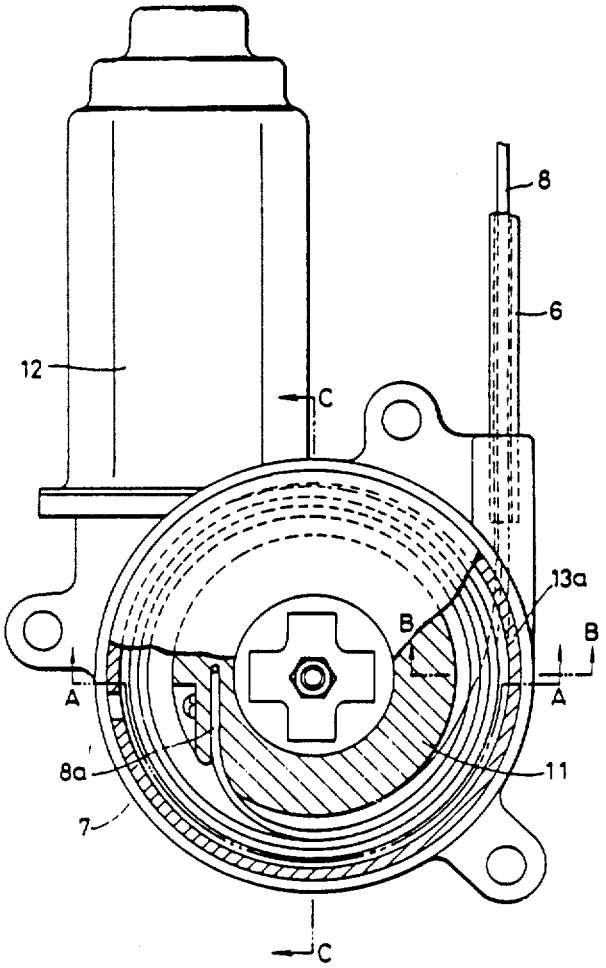
FIG. 2 is a partly broken-away front view of a first embodiment of the present invention.
Figure 3:
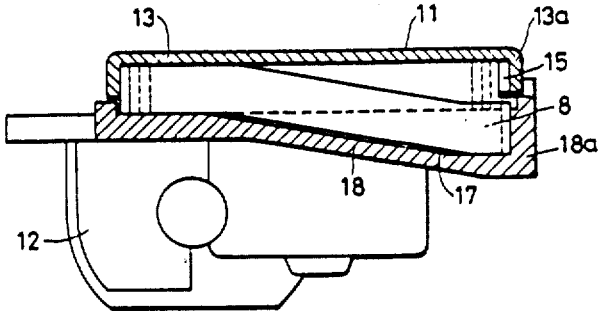
FIG. 3 is a cross-sectional view taken along a line A—A of FIG. 2.
Figure 4:
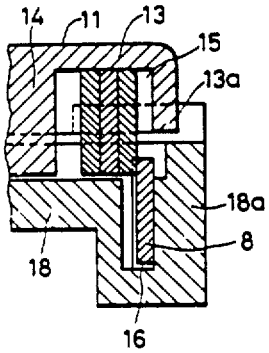
FIG. 4 is a cross-sectional view taken along a line B—B of FIG. 2.
Figure 5:
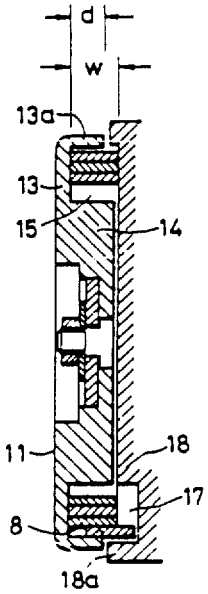
FIG. 5 is a cross-sectional view taken along a line C—C of FIG. 2.

Referring to FIG. 2 which shows the details of the take-up device 7, a drum member 11 to which one end 8a of the drive member 8 is attached may be rotated clockwise or counter-clockwise by a motor 12 through a gear train, not shown, and may take up or push out the drive member 8 in accordance with the rotation. The drum member 11 has a cup-shaped portion 13 and a drum portion 14 as shown in FIGS. 3 to 5 which are cross-sectional views taken along the line A—A, line B—B and line C—C, respectively, of FIG. 2, and forms therebetween an annular groove 15 for containing therein the drive member 8 taken up around the drum portion 14. In opposed relationship with the annular groove 15, a fixed side member 18 formed with an entrance and exit 16 for directing the drive member 8 into the tube 6 and a guide portion 17 for guiding the drive member 8 from the annular groove 15 to the entrance and exit 16 is secured to the fixed side. The entrance and exit 16 is formed at a position deviated from the annular groove 15 in the direction of the rotational axis of the drum member 11. The amount of this deviation is related to the depth of the annular groove 15 and if this depth is equal to the width of the belt-like drive member 8, the entrance and exit 16 must be deviated by an amount corresponding to said width, but if the depth d is made smaller than the width w as shown in FIG. 5, the entrance and exit 16 can correspondingly be formed toward the annular groove 15 and therefore, the amount of deviation can be reduced. Thus, the take-up device 7 becomes correspondingly smaller in size.

In the example, illustrated, the guide portion 17 changes from an inclined surface to a flat surface in the vicinity of the entrance and exit 16 and becomes parallel to the rotational axis of the drum member 11 at the entrance and exit 16, but alternatively, the inclined surface may further extend and the entrance and exit 16 may be provided at an angle with respect to the rotational axis.

Operation of the present embodiment will now be described on the basis of the above-described construction.

When the seat occupant becomes seated on the seat 1 and closes the door, not shown, for example, a door switch, not shown, senses it and the motor 12 starts to revolve and the drum member 11 is rotated clockwise as viewed in FIG. 2 and the drive member 8 begins to be taken up around the drum portion 14. At this time, the drive member 8 which has come in through the tube 6 and the entrance and exit 16 is directed to the level of the annular groove 15 by the guide portion 17 and is taken up. In this manner, the drive member 8 is taken up, whereby the movable anchor connected thereto is moved from the forward seat occupant liberating position rearwardly to the seat occupant restraining position. The movable anchor 4 arrives at the latch portion 9 and is latched there, whereupon a switch, not shown, is operated and the motor 12 is stopped. Thereby, the seat occupant 10 is restrained by the belt 3 shown by solid lines in FIG. 1.

Next, when the seat occupant 10 opens the door, the door switch senses it as previously described and the motor 12 starts to revolve in the reverse direction and the drum member 11 begins to be rotated counter-clockwise as viewed in FIG. 2. Thus, a push-out force acts on the drive member 8, whereby the drive member 8 in the outer peripheral portion is directed from the annular groove 15 to the entrance and exit 16 through the guide portion 17 and enters into the tube 6. At this time, the stationary outer periphery wall 13a of the cup-shaped portion 13 of the drum member 11 is also rotated and therefore, even if the drive member 8 which tends to be inflated outwardly due to said push-out force comes into contact with the stationary outer peripheral wall 13a, it will further promote the push-out force and will not diminish it, and the drive member 8 comes into contact with the outer peripheral wall 18a of the fixed side member 18 at the guide portion 17 extending in the range of a center angle of the order of 90° and thus does not so much adversely affect the push-out force. Accordingly, the drive member 8 is smoothly pushed out by the push-out force provided by the drum member 11. The adverse effect of the outer peripheral wall 18a of the fixed side member 18 can be further reduced either by reducing the length of the guide portion 17 by reducing the amount of deviation of the entrance and exit 16 or by making such a design that the drive member 8 cannot come into contact with the outer peripheral wall 18a until the drive member 8 fully leaves the annular groove 15 as shown in FIG. 5.

The movable anchor 4 is moved forwardly by the drive member 8 pushed out in this manner and, when the movable anchor 4 has arrived at the seat occupant liberating position, a switch, not shown, is operated to stop the motor 12. Thus, the seat occupant 10 can leave the seat 1 without being hindered by the belt 3.

Figure 6:
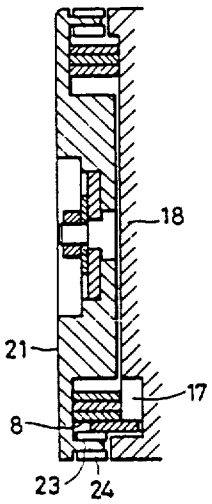
FIG. 6 illustrates a modification in which a roller is provided.
Figure 7:
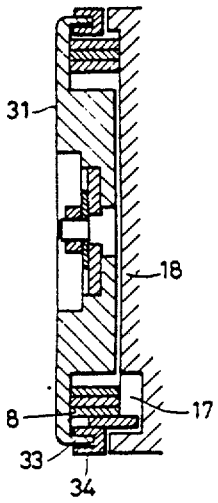
FIG. 7 illustrates a modification in which a ring is provided.

FIGS. 6 and 7 respectively show a modification in which, instead of the stationary outer peripheral wall 13a of the drum member 13, a roller 24 is rotatably disposed on a plurality of projections 23 of a drum member 21 and a modification in which a ring member 34 is rotatably mounted on the outer peripheral annular projection 33 of a drum member 31. By doing so, the drive member 8 can be more smoothly pushed out through the guide portion 17 without any resistance when it is to be pushed out.

Figure 8:
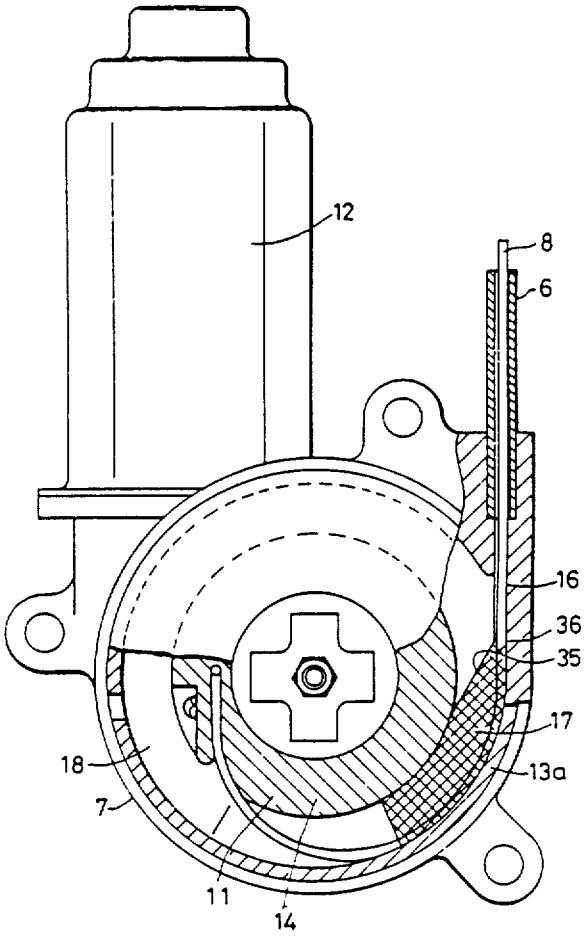
FIG. 8 illustrates a modification in which a trumpet-shaped guide groove is provided.

FIG. 8 shows a modification in which the guide portion 17 of the fixed side member 18 is in the form of an inclined trumpet-shaped guide groove (shown by cross hatching) defined by an inner wall 35 formed along a tangential line drawn from the vicinity of the entrance and exit 16 to the drum portion 14 of the drum member 11 and an outer wall 36 also formed along a tangential line drawn to the outer peripheral wall 13a of the drum member 11.

Thus, both when the drive member 8 is pushed out and when the drive member 8 is taken up, the drive member 8 only contacts the fixed surfaces, i.e., the inner wall 35 and the outer wall 36 at a minimum limit and is guided along the inner wall 35 and the outer wall 36 while depicting a reasonable curve and therefore, the drive member 8 is pushed out and taken up more smoothly and with a less friction resistance force.

Figure 9:
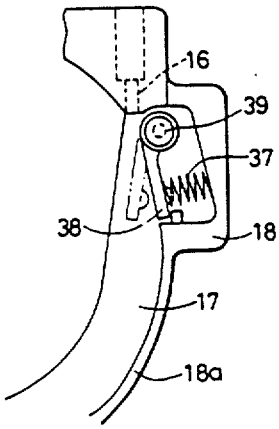
FIG. 9 illustrates a modification in which a pressing member is provided.

FIG. 9 shows a modification in which a pressing member 38 inwardly biased by a spring 37 is provided near the entrance and exit 16 of the fixed side member 18. Since the pressing member 38 is biased inwardly, namely, clockwise, about a shaft portion 39, and is about to assume its dots-and-dash line position, it brings as much inwardly as possible the drive member 8 guided along the guide portion 17 and thereby prevents the drive member 8 from being subjected to the friction resistance caused by the contact thereof with the outer wall 18a of the fixed side member 18 and also prevents the drive member 8 from bending. Accordingly, the undesirable possibility of the drive member 8 stagnating in the vicinity of said outer wall 18a is eliminated and smoother push-out of the drive member 8 is realized.

Figure 10:
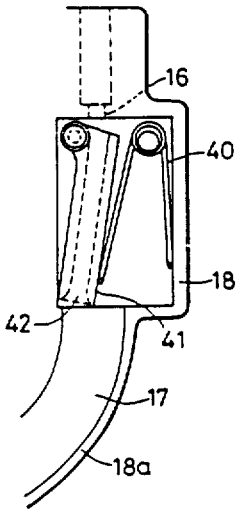
FIG. 10 illustrates a modification in which a movable guide member is provided.

FIG. 10 shows a modification in which a movable guide member 41 inwardly biased by a spring 40 is provided near the entrance and exit 16 of the fixed side member 18.

This modification is substantially similar in operation and effect to the example of FIG. 9 with the only exception that the drive member 8 is passed along the guide path 42 of the guide member 41.

Figure 11:
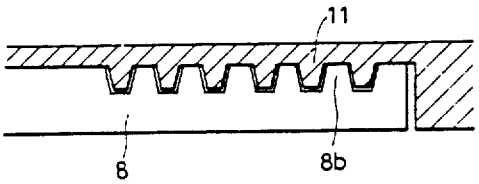
FIG. 11 illustrates the manner in which a drum member and a drive member are connected together.

Now, in the above-described embodiment, as shown in FIG. 2, one end 8a of the drive member 8 is connected to the drum member 11 by a fastening member, but alternatively, as shown in FIG. 11, the drum member 11 and the drive member 8 may be connected together by causing the concavo-convex portion 11a of the drum member 11 to mesh with the concavo-convex portion 8b of the drive member 8.

Figure 12:
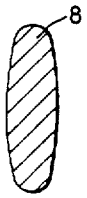
FIG. 12 illustrates the drive member having a central thick portion.

Also, as regards the drive member 8, the central portion of the width of the cross-section thereof may be made somewhat thick, (see FIG. 12) whereby the area of contact thereof with the wall surface of the fixed side member 18 is further reduced and smoother push out of the drive member 8 becomes possible.

Figure 13:
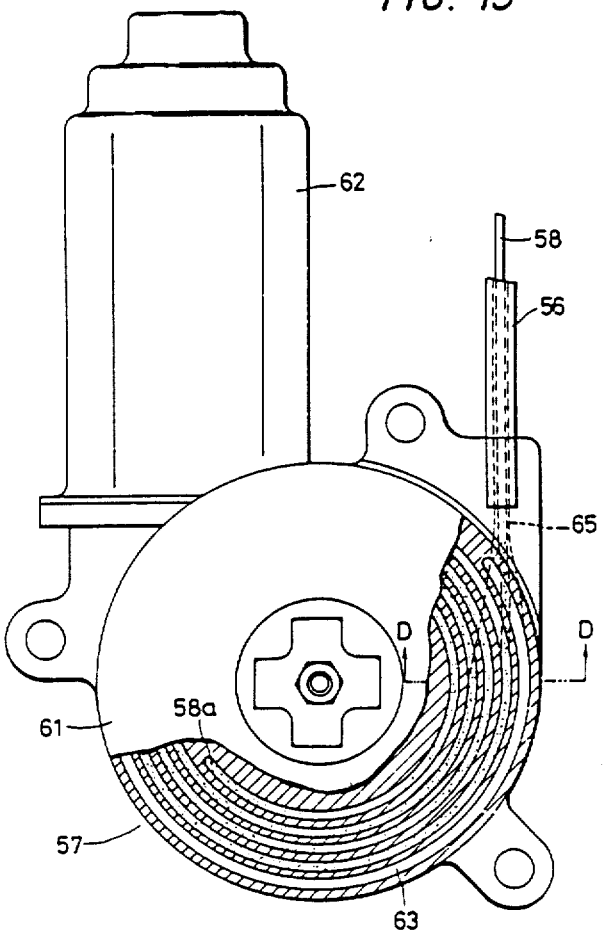
FIG. 13 is a partly broken-away front view of a second embodiment of the present invention.

Referring to FIG. 13 which shows a second embodiment, a rotatable member 61 to which one end 58a of a drive member 58 is attached may be rotated clockwise or counter-clockwise by a motor 62 through a gear train, not shown, and may correspondingly take up or push out the drive member 58. The rotatable member 61 is formed with a spiral groove 63 which takes up or pushes out the drive member 58 with order.

Figure 14:
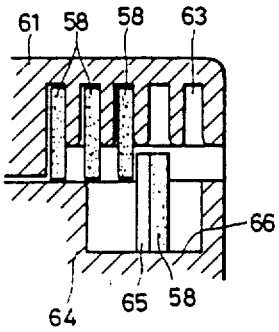
FIG. 14 is a cross-sectional view taken along a line D—D of FIG. 13.

As shown in FIG. 14 which is a cross-sectional view taken along line D—D of FIG. 13, the spiral groove 63 opens downwardly and has a depth smaller than the width of the belt-like drive member 58. In an opposed relationship with the spiral groove 63, a fixed side member 64 is provided on the fixed side, and there are formed in the fixed side member an entrance and exit 65 for directing the drive member 58 into a tube 56 and a guide portion 66 forming an inclined surface for guiding the drive member 58 from the groove 63 to the entrance and exit 65. The entrance and exit 65 is formed at a position deviated from the groove 63 in the direction of the rotational axis of the rotatable member 61. The amount of this deviation is related to the depth of the groove 63 and, if this depth is equal to the width of the drive member 58, it will be necessary to deviate the entrance and exit 65 by an amount corresponding to said width, but if the depth of the groove 63 is smaller than said width as shown in FIG. 14, the entrance and exit 65 may correspondingly be formed toward the groove 63. Correspondingly, the take-up device 57 will become smaller is size.

Figure 15:
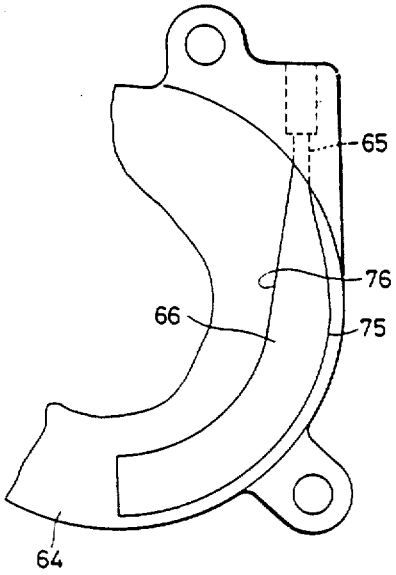
FIG. 15 illustrates a trumpet-shaped guide groove.

Next, as regards the guide portion 66 of the fixed side member 64, it is desirable for smooth take-up and draw-out of the drive member 58 that the guide portion 66 be formed in its relation with the entrance and exit 65 so that the drive member 58 is liberated from the restraint of the groove 63 near the point of contact of a tangential line extended from the entrance end exit 65 to each groove periphery of the spiral groove 63. As an example thereof, there is a guide portio 66 formed as a trumpet-shaped inclined groove as shown in FIG. 15. This guide portion 66 is defined by wall surfaces 75 and 76 formed substantially along a tangential line extending from the entrance and exit 65 to the outermost periphery and the innermost periphery of the spiral groove 63.

Operation of the second embodiment will now be described on the basis of the above-described construction.

In FIG. 1, when the seat occupant 10 sits down on the seat 1 and closes the door, not shown, for example, a door switch, not shown, senses it and the motor 62 starts to revolve and the rotatable member 61 is rotated clockwise as viewed in FIG. 13 and begins to take up the drive member 58 into the spiral groove 63 with good order. At this time, the drive member 58 having come in through the tube 56 and the entrance and exit 65 is directed to each level of the spiral groove 63 by the guide portion 66 and smoothly taken up. By the drive member 58 being thus taken up, the movable anchor 4 (FIG. 1) connected thereto is moved rearwardly from the forward seat occupant liberating position to the seat occupant restraining position. When the movable anchor 4 arrives at the latch portion 9 and is restrained thereat, a switch, not shown, operates and the motor 62 is stopped. Thus, the seat occupant 10 is restrained by the belt 3 shown by solid lines in FIG. 1.

Next, in FIG. 1, when the seat occupant 10 opens the door, the door switch senses it as previously described and the motor 62 starts to revolve in the reverse direction and the rotatable member 61 begins to rotate counter-clockwise as viewed in FIG. 13. Thus, a push-out force acts on the drive member 58, and the portion of the drive member 58 which is in the groove on the outer periphery side of the spiral groove 63 passes through the guide portion 66 and is smoothly directed to the entrance and exit 65 and comes into the tube 56. At this time, a force which tends to inflate the drive member 58 outwardly acts on the drive member 58, but since this force is controlled by the spiral groove 63, the drive member 58 does not strongly contact the stationary wall surface of the fixed side member 64 and accordingly the push-out force is not diminished, but the drive member 58 is pushed smoothly and quickly.

The movable anchor 4 (FIG. 1) is moved forwardly by the drive member 58 pushed out in this manner and, when the movable anchor has arrived at the seat occupant liberating position, a switch, not shown, operates to stop the motor 62. Thus, in FIG. 1, the seat occupant can leave the seat 1 without being hindered by the belt 3.

Figure 16:
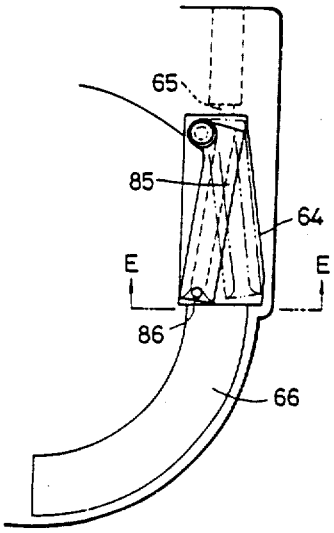
FIG. 16 illustrates a modification in which a movable guide member is provided.
Figure 17:
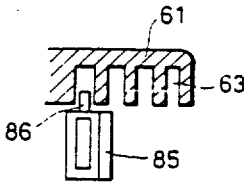
FIG. 17 is a cross-sectional view taken along a line E—E of FIG. 16.

FIG. 16 and FIG. 17 which is a cross-sectional view taken along the line E—E of FIG. 16 show a modification having a movable guide member 85 provided so as to be movable in operative assocation with the roll diameter of the drive member 58, in more particular, to move inwardly in response to the decrease of the roll diameter of the drive member 58 in the spiral groove 63, said operative association being accomplished by causing the projection 86 of the guide member 85 to be engaged with the spiral groove 63 of the rotatable member 61. Thus, the drive member 58 may be pushed out more smoothly and without bending. Further, the play of the drive member 58 in the driving device is eliminated and movement of the movable anchor becomes smooth.

Figure 18:
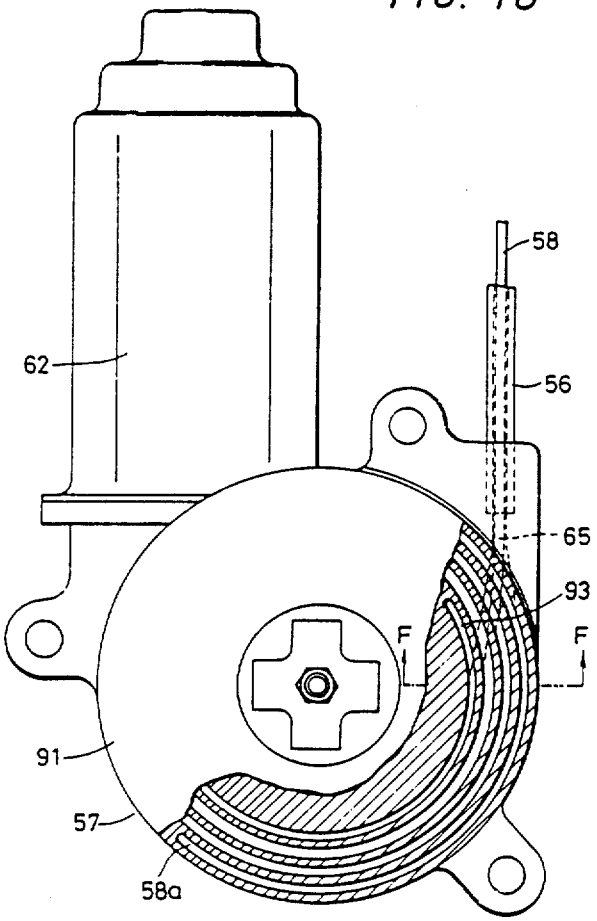
FIG. 18 is a partly broken-away front view of a third embodiment of the present invention.
Figures 19, 20:
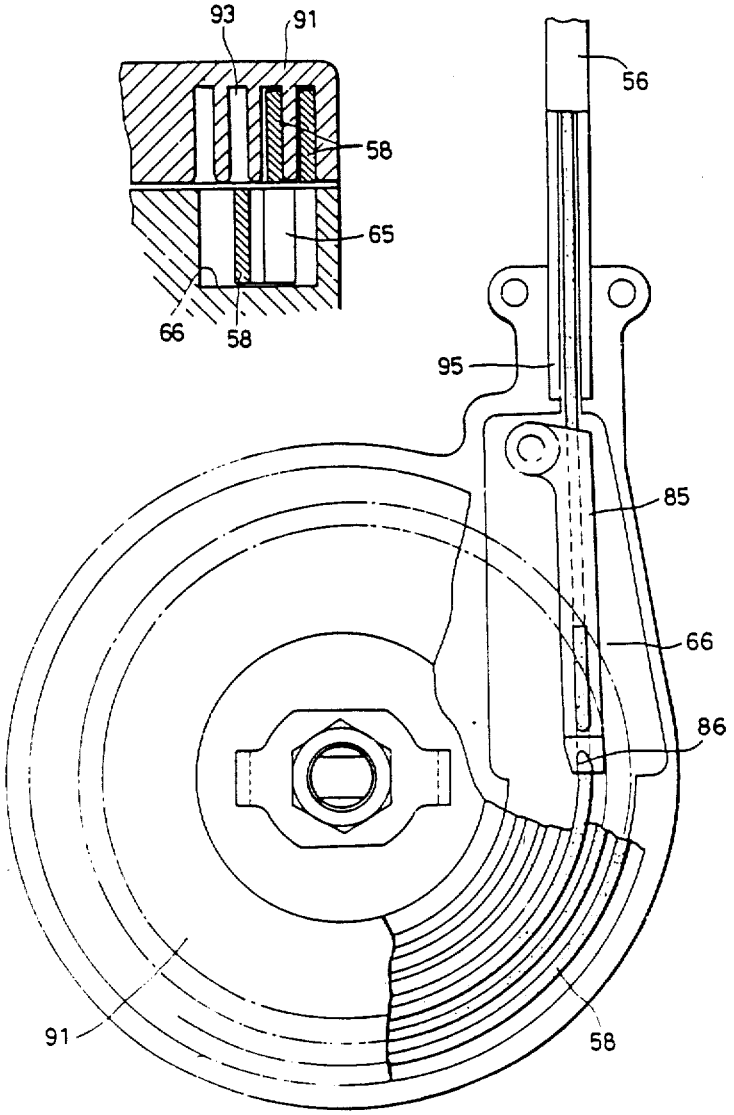
FIG. 19 is a cross-sectional view taken along a line F—F of FIG. 18.
FIG. 20 is a partly broken-away front view of a fourth embodiment of the present invention.

Description will now be made of a third embodiment in which one end 58a of the drive member 58 is attached to the outermost side of the spiral groove of the rotatable member. In this embodiment, as shown in FIG. 18, the drive member 58 has its innermost portion directed to the entrance and exit 65 through the guide portion 66. Also, a spiral groove 93, as shown in FIG. 19 which is a cross-sectional view taken along the line F—F of FIG. 18, has a depth substantially equal to the width of the drive member 58. Operation of this embodiment is substantially the same as that of the second embodiment, but if in the arrangement shown in FIG. 1 the driving device 57 is that of the third embodiment, a relatively small amount of the drive member 58 is taken up or pushed out for the same amount of rotation of the rotatable member 91 because, on the seat occupant restraining position side, the drive member 58 extends outwardly from the inner portion of the spiral groove 93 to the entrance and exit 65 and accordingly, movement of the movable anchor 4 (FIG. 1) becomes slow on the side near the seat occupant, and this is preferable in safety.

Figure 21:
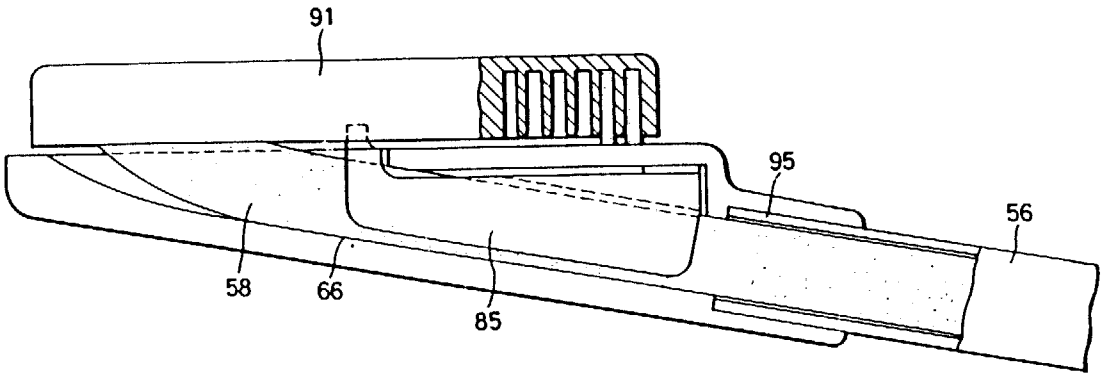
FIG. 21 is a side view of the fourth embodiment.

Now, in the above-described embodiments, the entrance end and exit 65 is provided in parallelism to the rotational axis of the rotatable member, but alternatively, as in a fourth embodiment shown in FIGS. 20 and 21, the inclined surface of the guide portion 66 may extend as it is and the entrance and exit 95 may be provided at an angle with respect to the rotational axis of the rotatable member 91. Thus, the take-up or push-out of the drive member 58 becomes smoother. In the fourth embodiment, as in the third embodiment, one end of the drive member 58 is attached to the outermost side of the spiral groove and a movable guide member 85 as shown in FIG. 16 is provided.

Figure 22:
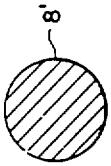
FIG. 22 illustrates a drive member having a circular cross-section.

Although, in the above-described embodiments, use is made of a belt-like drive member, having a rectangular cross-section use may also be made of a rope-like drive member having a circular cross-section. See drive member 8' in FIG. 22.

We claim:

1. A driving device for moving a seat belt in an automatic seat belt system between a seat occupant liberating position and a seat occupant restraining position, said device comprising:

an elongate flexible drive member, one end of said drive member being operatively connected to the seat belt, a rotatable member formed with a portion for containing the drive member, the other end of the drive member being attached to said rotatable member and the drive member being taken up into and pushed out from said containing portion by the rotation of said rotatable member, driving means for rotating the rotatable member, a fixed side member formed with a port through which the drive member is taken up into and pushed out from said containing portion, said port lying at a position deviated from said containing portion in the direction of the rotational axis of the rotatable member.

2. A driving device according to claim 1, wherein said rotatable member is a drum member and said containing portion is an annular groove.

3. A driving device according to claim 1, wherein said rotatable member is a drum member and said containing portion is a spiral groove.

4. A driving device according to claim 2, wherein said drive member is a belt-like member and the depth of said groove is smaller than the width of said belt-like member.

5. A driving device according to claim 2, wherein said fixed side member is formed with a guide portion for guiding the drive member from said groove to said port.

6. A driving device according to claim 5, wherein said drum member has an inner wall and an outer peripheral wall and said guide portion is a trumpet-shaped guide groove defined by an inner wall formed along a tangential line drawn from the vicinity of said port to said inner wall of the drum member and an outer wall formed along a tangential line drawn from the vicinity of said port to said outer peripheral wall of the drum member.

7. A driving device according to claim 1, said drive member is a belt-like member, the thickness of the central portion of said belt-like member being somewhat greater than that of the opposite end portions thereof.

8. A driving device according to claim 2, wherein said groove is defined by an inner wall and an outer peripheral wall and said outer peripheral wall is formed by a plurality of rollers rotatably disposed on a plurality of projections of the drum member.

9. A driving device according to claim 2, wherein said groove is defined by an inner wall and an outer peripheral wall and said outer peripheral wall is formed by a ring member rotatably mounted on an outer peripheral annular projection of the drum member.

10. A driving device according to claim 2, wherein said drive member is guided toward said port by an inwardly biased pressing member.

11. A driving device according to claim 3, said drive member is guided toward said port by a movable guide member provided so as to move inwardly in response to the decrease of the roll diameter of the drive member in said sprial groove.

12. A driving device according to claim 3, further comprising a movable guide member disposed to move with the change of the diameter of a roll formed by the drive member in said spiral groove for guiding said drive member toward said port.

13. A driving device according to claim 12, wherein said movable guide member has a portion engaged with said spiral groove so as to move with the change of the roll diameter of the drive member.

14. A driving device according to claim 1, wherein said drive member is a rope-like member having a substantially circular cross-section.

*15. A driving device according to claim 3, wherein said fixed side member is formed with a guide portion for guiding the drive member from said groove to said port.*

*16. A driving device according to claim 15, wherein said guide portion includes an inclined surface extending between one plane of said containing portion and a plane corresponding to a bottom end of said port.*

*17. A driving device according to claim 16, wherein said inclined surface is curved at least partly.*

*18. A driving device according to claim 16, wherein said drive member is a belt-like member and said port is rectangular in shape.*

*19. A driving device according to claim 1, wherein said port is integrally formed in said fixed side member.*

*20. A driving device according to claim 1, wherein said port is formed as a through-hole extending through a portion of said fixed side member.*

*21. A driving device according to claim 19, said drive member is a belt-like member and said port is rectangular in shape substantially corresponding in shape to said belt-like member.*

*22. A driving device according to claim 19, further including an outer tubular guide which has its one end fixedly attached to a portion of said fixed side member as located adjacent to said port.*

*23. A driving device according to claim 1, said driving means includes a rotatable drive shaft to which said rotatable member is fixedly attached, whereby said rotatable member is driven to rotate by said drive shaft, whose rotational axis defines said rotational axis of the rotatable member.*

*24. A driving device according to claim 23, wherein said driving means further includes a motor which is operatively coupled to said drive shaft so that said rotatable member is driven to rotate by said motor through said drive shaft.*

*25. A driving device according to claim 24, wherein said driving means further includes a gear train through which said motor is operatively coupled to said drive shaft.*

*26. A driving device according to claim 25, wherein said fixed side member is formed with a guide portion for guiding the drive member and wherein said guide portion includes an enclosed guide region which is located adjacent to said port and defined by a top wall, a bottom wall and a pair of side walls to thereby define said enclosed guide region.*

*27. A driving device according to claim 26, wherein said containing portion is a spiral groove and further comprising a movable guide member disposed inside of said enclosed guide region to move with the change of the diameter of a roll formed by the drive member in said spiral groove for guiding said drive member toward said port.*

*28. A driving device according to claim 27, wherein said movable guide member has a portion engaged with said spiral groove so as to move with the change of the roll of the drive member.*

* * * * *